(12) United States Patent
Thai et al.

(10) Patent No.: US 9,080,082 B2
(45) Date of Patent: Jul. 14, 2015

(54) MEDIUM DENSITY POLYETHYLENE FILM LAYER AND MULTILAYER FILM COMPRISING SAME

(71) Applicant: ExxonMobil Chemical Patents Inc., Baytown, TX (US)

(72) Inventors: Hao C. Thai, Malden, MA (US); George F. Cretekos, Farmington, NY (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 46 days.

(21) Appl. No.: 13/859,295

(22) Filed: Apr. 9, 2013

(65) Prior Publication Data

US 2013/0309426 A1    Nov. 21, 2013

Related U.S. Application Data

(60) Provisional application No. 61/648,825, filed on May 18, 2012.

(51) Int. Cl.
*B32B 1/02* (2006.01)
*B32B 27/08* (2006.01)
*C09J 123/16* (2006.01)
*C09J 7/02* (2006.01)
*B32B 7/02* (2006.01)
*B32B 7/12* (2006.01)
*C09J 123/06* (2006.01)
*C09J 123/14* (2006.01)
*C09D 123/08* (2006.01)
*C08L 23/10* (2006.01)
*B32B 27/18* (2006.01)
*B32B 27/20* (2006.01)
*B32B 27/32* (2006.01)

(52) U.S. Cl.
CPC ............. *C09J 123/16* (2013.01); *B32B 1/02* (2013.01); *B32B 7/02* (2013.01); *B32B 7/12* (2013.01); *B32B 27/08* (2013.01); *B32B 27/18* (2013.01); *B32B 27/20* (2013.01); *B32B 27/205* (2013.01); *B32B 27/32* (2013.01); *C08L 23/10* (2013.01); *C09D 123/0815* (2013.01); *C09J 7/0242* (2013.01); *C09J 7/0296* (2013.01); *C09J 123/06* (2013.01); *C09J 123/145* (2013.01); *B32B 2250/242* (2013.01); *B32B 2255/10* (2013.01); *B32B 2255/205* (2013.01); *B32B 2255/26* (2013.01); *B32B 2270/00* (2013.01); *B32B 2307/31* (2013.01); *B32B 2307/746* (2013.01); *B32B 2439/46* (2013.01); *C08L 2203/16* (2013.01); *C08L 2205/22* (2013.01); *C09J 2201/61* (2013.01); *C09J 2201/622* (2013.01); *C09J 2400/163* (2013.01); *C09J 2423/006* (2013.01); *C09J 2423/04* (2013.01); *Y10T 156/1002* (2015.01); *Y10T 428/1334* (2015.01); *Y10T 428/24975* (2015.01); *Y10T 428/2826* (2015.01)

(58) Field of Classification Search
CPC ....... B32B 27/18; B32B 27/32; B32B 27/327; Y10T 28/1334
USPC ........... 428/34.8, 35.2, 35.4, 35.5, 35.7, 36.4, 428/36.6, 36.7, 36.9, 36.91, 515–523, 500; 525/191, 222, 227–229, 240, 241
See application file for complete search history.

(56) References Cited

U.S. PATENT DOCUMENTS

| | | | |
|---|---|---|---|
| 4,578,316 A * | 3/1986 | Clauson et al. | 428/516 |
| 4,956,232 A | 9/1990 | Balloni et al. | |
| 5,888,648 A | 3/1999 | Donovan et al. | |
| 6,312,825 B1 | 11/2001 | Su et al. | |
| 6,326,068 B1 | 12/2001 | Kong et al. | |
| 6,455,150 B1 * | 9/2002 | Sheppard et al. | 428/327 |
| 6,534,137 B1 | 3/2003 | Vadhar | |
| 6,624,247 B2 | 9/2003 | Kume et al. | |
| 6,641,913 B1 | 11/2003 | Hanyu et al. | |
| 6,682,822 B2 | 1/2004 | Cretekos et al. | |
| 7,537,829 B2 | 5/2009 | Pellingra et al. | |
| 2011/0129681 A9 | 6/2011 | Rehkugler et al. | |

OTHER PUBLICATIONS

Wikipedia.org entry for "Polyethylene", 5 pages, accessed Nov. 12, 2014.*

* cited by examiner

*Primary Examiner* — Walter B Aughenbaugh
(74) *Attorney, Agent, or Firm* — Kevin M. Faulkner; Leandro Arechederra, III

(57) ABSTRACT

A multilayer film structure including (a) a core layer having a first side and a second side, the core layer including at least one core polymer; (b) a first tie layer having a first side and a second side, the second side of the first tie layer on the first side of the core layer; (c) a second tie layer having a first side and a second side, the first side of the second tie layer on the second side of the core layer; (d) a sealant skin layer having a side on the first side of the first tie layer; and (e) a second skin layer having a side on the second side of the second tie layer, is provided.

15 Claims, No Drawings

US 9,080,082 B2

MEDIUM DENSITY POLYETHYLENE FILM LAYER AND MULTILAYER FILM COMPRISING SAME

CROSS-REFERENCE TO RELATED APPLICATION

This application claims the benefit of and priority to U.S. Ser. No. 61/488,825, filed May 18, 2012, which is incorporated by reference.

FIELD OF THE INVENTION

This invention relates to a sealant film or skin layer for a multilayer film structure which provides exceptional sealing performance, low coefficient of friction and improved manufacturing, and to heat-sealable, multilayer polymer film comprising the sealant skin layer. The invention further relates to a method for manufacturing the multilayer film structure comprising the sealant skin layer and use thereof.

BACKGROUND OF THE INVENTION

Polypropylene-based multilayer films are widely used in packaging applications, such as pouches for dry food mixes, pet foods, snack foods, and seeds. Such multilayer films must have the ability to form reliable hermetic seals at relatively low temperatures. In some situations the film must do so in the presence of contamination in the seal region from the contents of the packaging.

U.S. Pat. No. 4,578,316 (Clauson et al.) discloses an oriented film structure having a low film to film coefficient of friction comprising a polypropylene film having on at least one surface a layer of a blend of polypropylene and a member selected from the group consisting of medium density polyethylene, high density polyethylene, and a mixture thereof.

U.S. Pat. No. 4,956,232 (Balloni et al.) discloses a multilayer polypropylene film structure consisting essentially of an outer heat sealable layer (A) formed from a polymer composition consisting essentially of heat sealable resin compounded with slip additives which are incompatible with polypropylene; core layer (B) consisting essentially of an isotactic polypropylene compounded with slip additives which are incompatible with polypropylene; and outer layer (C) consisting essentially of an isotactic polypropylene in the substantial absence of slip additives.

U.S. Pat. No. 5,888,648 (Donovan et al.) discloses a multilayer film which has a composite structure for providing hermetic seals to packages manufactured in a high speed packaging apparatus. The structure of the multilayer film includes a main substrate and a sealant layer. The sealant layer, in turn, includes an intermediate layer which has the primary function of compliance during sealing and a sealing layer which has the primary function of providing adhesive properties to the completed seal. The terms "compliant" or "compliance" refer to the ability of the sealed area of film to deform or conform within the sealing jaws during sealing operations and additionally to elastically and/or plastically deform and diffuse stress throughout the multilayer film substrate subsequent to sealing operations when the seal is subjected to stress.

U.S. Pat. No. 6,312,825 B1 (Su et al.) discloses a multilayer film of the type suitable for packaging applications having oxygen and water vapor transmission barrier properties including a polyolefin core layer containing wax; a first surface layer including a polyolefin copolymer or terpolymer; and a second surface layer including a polar layer having ester functionality.

U.S. Pat. No. 6,326,068 (Kong et al.) discloses a multilayer film that has a composite structure for providing hermetic seals to packages manufactured in a high speed packaging apparatus. The structure of the multilayer film includes layers A/B/C/D. Skin layer A is formed from polypropylene copolymer with melt flow rate greater than one or linear high density polyethylene with melt index greater than one. Core layer B is formed from polypropylene. Intermediate layer C has the primary function of compliance during sealing and sealing layer D has the primary function of providing adhesive properties to the completed seal. The sealing layer D includes an antiblock agent comprising non-distortable organic polymer particles having an average particle size greater than 6 μm.

U.S. Pat. No. 6,534,137 B1 (Vadhar) discloses a two-component laminated multilayer film suitable for use in packaging articles, such as pet food, comprising a first component and a non-heat-shrinkable second component. The first component comprises an outer first film layer, an optional second film layer, and an optional third film layer. The first and third film layers comprise ethylene/alpha-olefin copolymer, while the second film layer is a modified ethylene copolymer. The second component comprises an outer fourth layer, an oxygen barrier fifth layer, and sixth and seventh layers which serve as tie layers and are positioned on either side of the barrier layer. The multilayer film is heat sealable to itself and another film.

U.S. Pat. No. 6,624,247 B1 (Kume et al.) discloses a polypropylene-based film of a resin composition (C) comprising: 40 wt % to 95 wt % of a propylene-based copolymer (A) selected from a propylene random copolymer (i) of propylene with ethylene and/or alpha-olefin and a propylene-based copolymer (ii) composed of 1 wt % to 30 wt % of a component (a) obtained by copolymerizing propylene, an alpha-olefin, and ethylene in a first step; 70 wt % to 99 wt % of a component (b) obtained by copolymerizing those in the subsequent step, in which the copolymerization ratio is different from that in the first step; and 5 wt % to 60 wt % of a polypropylene-ethylene and/or alpha-olefin block copolymer (B) having a xylene soluble component ("CXS") of 5.0 wt % or more, wherein the CXS has a content of ethylene and/or the alpha-olefin of 14 to 35 molar percent and wherein the heat-seal temperature of the film of the composition (C) is lower by 3° C. or more than those of respective films of the compositions (A) or (B).

U.S. Pat. No. 6,641,913 B1 (Hanyu et al.) discloses a multilayer polyolefin film of the type suitable for packaging applications in which heat seals are formed. The multilayer film comprises a substrate layer formed of a crystalline thermoplastic polymer having an interface surface. A heat-sealable surface layer is bonded to the interface surface of the substrate layer and is formed of a syndiotactic propylene polymer effective to produce a heat seal with itself at a sealing temperature of less than 110° C. The multilayer film may be biaxially-oriented. In the production of the multilayer film, a crystalline thermoplastic polymer is extruded and formed into a substrate layer film. A second polymer comprising a syndiotactic propylene polymer which is effective to form a heat-sealable surface layer is extruded separately to form a surface layer that is thereafter bonded to the interface of the substrate layer at a temperature within the range of 150° C. to 260° C.

U.S. Pat. No. 6,682,822 B2 (Cretekos et al.) discloses a multilayer polymeric film comprising a core layer comprising thermoplastic polymer and optionally an antistatic agent; a printable or sealable functional layer; and an additional layer on the opposite side of the core layer comprising polypropylene homopolymer, a solid antiblock, and silicone oil.

U.S. Pat. No. 7,537,829 B2 (Pellingra et al.) discloses a multilayer film suitable for packaging and having improved sealing properties. The film comprises a core layer comprising a core polymer and at least one soft polymer; a first tie layer comprising a soft polymer and, optionally, a tie layer polymer; and a sealant layer on the first tie layer opposite the core layer comprising a Zeigler-Natta or metallocene catalyzed polypropylene homopolymer, ethylene-propylene copolymer, propylene-butylene copolymer, ethylene-butylene copolymer, ethylene-propylene-butylene terpolymer, ethylene vinyl acetate, or blend thereof. The seal strength of this film is disclosed to be greater than 600 grams per inch for a seal formed at a temperature of at least 93.3° C. The publication U.S. 2011/0129681 A9 (Rehkugler et al.), related to U.S. Pat. No. 7,537,829, discloses a sealable multilayer packaging structure comprising a first substrate; and a second substrate comprising polymeric film including a core layer with certain specifically described properties, a tie layer with certain specifically described composition, and a sealant layer.

Though each of the above disclosed films represent various points related to packaging films, none of the above disclosed films combine desired improvements in processability, seal strength, reduced seal temperature, and coefficient of friction needed for some of today's challenging packaging operations. Opportunities exist for polymer films to replace other packaging substrates, such as paper and foil, in many temperature-sensitive packaging operations. The present invention meets these and other needs.

SUMMARY OF THE INVENTION

It is an object of the present invention to provide a sealant film or skin layer for a multilayer film structure which provides exceptional sealing performance, low coefficient of friction, and improved manufacturing. It is a further object of the present invention to provide a heat-sealable, multilayer polymer film comprising the sealant skin layer that has improved processing characteristics. Other objects of the present invention are to provide a method for manufacturing the multilayer film structure comprising the sealant skin layer and use thereof.

These and other objects are achieved by the present invention which provides as an embodiment a sealant skin layer for a multilayer film structure, said skin layer comprising a blend of from 25 wt % to 75 wt % polyethylene having a density of from 0.910 g/cm$^3$ to 0.950 g/cm$^3$ (or "MDPE"), from 25 wt % to 75 wt % $C_2$ to $C_6$ random copolymer or terpolymer and from 0.3 wt % to 1 wt % antiblock agent, preferably a non-silicon-based antiblock agent.

Another embodiment of the present invention is a multilayer film structure comprising (a) a core layer having a first side and a second side, said core layer comprising at least one core polymer, preferably polypropylene; (b) a first tie layer having a first side and a second side, the second side of the first tie layer on the first side of said core layer, said first tie layer comprising an impact copolymer and, optionally, a tie layer polymer, the optional tie layer polymer comprising at least one of a $C_2$ to $C_8$ alpha-olefin homo-, co-, or terpolymer, a metallocene catalyzed homo-, co-, or terpolymer comprising propylene, and blends thereof; (c) a second tie layer having a first side and a second side, the first side of the second tie layer on the second side of said core layer, said second tie layer comprising a tie layer polymer comprising at least one of a $C_2$ to $C_8$ alpha-olefin homo-, co-, or terpolymer, a metallocene catalyzed homo-, co-, or terpolymer comprising propylene, and blends thereof; (d) a sealant skin layer having a side on the first side of the first tie layer, said sealant skin layer comprising a blend of from 25 wt % to 75 wt % MDPE having a density of from 0.910 g/cm$^3$ to 0.950 g/cm$^3$, from 25 wt % to 75 wt % $C_2$ to $C_6$ random copolymer or terpolymer and from 0.3 wt % to 1 wt % antiblock agent; and (e) a second skin layer having a side on the second side of the second tie layer, said second skin layer comprising a polymer selected from the group consisting of polyethylene (PE), polypropylene (PP), ethylene-propylene (EP) copolymer, propylene-butylene (PB) copolymer, ethylene-propylene-butylene (EPB) terpolymer, ethylene-vinyl alcohol (EVOH) polymer, and blends thereof. The multilayer film structure of this embodiment exhibits a seal strength of greater than 1100 grams/inch (433 g/cm), for example 1300 grams/inch (512 g/cm), for a seal formed on a crimp sealer at a temperature less than or equal to 120° C., e.g., a crimp sealer operated at 200 g/25 mm seal weight with 60 psi pressure and 0.75 second dwell time of the sealant skin layer to itself.

Another embodiment of the present invention is a method for manufacturing a multilayer film structure comprising co-extruding at least the layers (a) through (e) above in the relationship indicated. Another embodiment of the present invention is a method for using a multilayer film structure comprising co-extruding at least the layers (a) through (e) above in the relationship indicated; enclosing an article within at least a portion of the co-extruded multilayer film; engaging a first portion of the sealant skin layer with a second portion of the sealant skin layer at a seal area; and applying pressure and heat at the seal area to cause the first portion of the sealant skin layer to engage with the second portion of the sealant skin layer to create at least one of a fin seal, a lap seal, and a crimp seal in the seal area.

DETAILED DESCRIPTION OF THE INVENTION

The present invention overcomes the problem in multilayer film extrusion of having reduced or no die lip polymer buildup while maintaining a high seal strength. This is accomplished by providing a film having at least a sealant skin, which is a surface layer of the film, that comprises a medium density polyethylene ("MDPE") or blend of the MDPE with a ethylene-propylene-butene terpolymer ("EPB terpolymer") or ethylene-propylene random copolymer and an optional antiblock agent, preferably a non-silicon based antiblock agent. The inventive films having such a sealant skin layer preferably have a Haze (ASTM D1003) of less than 20% or 15% or 10%. The Gloss (ASTM D2457, 45°) of the inventive films is preferably greater than 60% or 70% or 80% or 85%.

Each of the layers of the present multilayer film function together to effect a multilayer film whereby the sealing function of the film realizes improved performance through an integration of layers that are more compliant or resilient than prior films, when subjected to the pressures of sealing jaws and when subjected to subsequent stresses on the seal, such as seal opening forces. The seal strength is enhanced by improving the melt or flow characteristics of these layers during sealing. Decreasing the melt temperature of the layers, including particularly the first tie layer, may increase the degree of entanglement and intermingling of the adjacent layers. Thus, the layers provide improved bonding, delamination and destruction resistance, and improved flowing in seal folds or creases, thereby effecting improved seal strength while simultaneously facilitating a reduced frequency of leak-paths in critical seal areas, such as seal corners, folds, or creases. The reduced modulus or improved elasticity of the multilayer film permits improved diffusion throughout the layers of forces or stresses applied to the seal, thereby facilitating improved seal strength. Additionally, depending upon the particular resin component selection, some embodiments may also enjoy lowered minimum seal temperatures.

The present invention is directed to a sealant film or skin layer for a multilayer film structure which provides exceptional sealing performance, low coefficient of friction, and improved manufacturing, e.g., reduced blocking and roll winding; and heat-sealable, multilayer film structure comprising the sealant skin layer. The sealant skin layer comprises a blend of from 25 or 30 or 35 or 40 wt % to 55 or 50 or 65 or 70 or 75 wt % MDPE, by weight of the sealant skin layer, having a density of from 0.910 or 0.915 or 0.920 g/cm$^3$ to 0.930 or 0.940 or 0.945 or 0.950 g/cm$^3$, from 25 or 30 or 35 or 40 wt % to 55 or 50 or 65 or 70 or 75 wt % of a $C_2$ to $C_6$ random copolymer or terpolymer of density less than 0.910 g/cm$^3$, and from 0.3 wt % to 1 wt % antiblock agent, preferably non-silicon based. The multilayer film structure comprising (a) a core layer having a first side and a second side, said core layer comprising at least one core polymer; (b) a first tie layer having a first side and a second side, the second side of the first tie layer on the first side of said core layer, said first tie layer comprising an impact copolymer and, optionally, a tie layer polymer, the optional tie layer polymer comprising at least one of a $C_2$ to $C_8$ alpha-olefin homo-, co-, or terpolymer, a metallocene catalyzed homo-, co-, or terpolymer comprising propylene, and blends thereof; (c) a second tie layer having a first side and a second side, the first side of the second tie layer on the second side of said core layer, said second tie layer comprising a tie layer polymer comprising at least one of a $C_2$ to $C_8$ alpha-olefin homo-, co-, or terpolymer, a metallocene catalyzed homo-, co-, or terpolymer comprising propylene, and blends thereof; (d) a sealant skin layer comprises a blend of from 25 or 30 or 35 or 40 wt % to 55 or 50 or 65 or 70 or 75 wt % MDPE, by weight of the sealant skin layer, having a density of from 0.910 or 0.915 or 0.920 g/cm$^3$ to 0.930 or 0.940 or 0.945 or 0.950 g/cm$^3$, from 25 or 30 or 35 or 40 wt % to 55 or 50 or 65 or 70 or 75 wt % of a $C_2$ to $C_6$ random copolymer or terpolymer of density less than 0.910 g/cm$^3$, and from 0.3 wt % to 1 wt % antiblock agent; and (e) a second skin layer having a side on the second side of the second tie layer, said second skin layer comprising a polymer selected from the group consisting of polyethylene (PE), polypropylene (PP), ethylene-propylene (EP) copolymer, propylene-butylene (PB) copolymer, ethylene-propylene-butylene (EPB) terpolymer, ethylene-vinyl alcohol (EVOH) polymer, and blends thereof.

In the multilayer film of this invention, one or more "impact" (also referred to as "soft") polymers are blended or provided into the first tie layer at up to 100 wt %, e.g., from 25 wt % to 100 wt %, to facilitate improved seal strengths and in some embodiments, to reduce sealing temperature and low-temperature sealing properties. The soft polymer may be considered a softening or compliance-enhancing component. The sealant skin layer is provided on the side of the first tie layer opposite the core layer. The presence of the soft polymer permits the first tie layer, and the sealant skin layer to act synergistically with each other to dissipate stress. When force is applied to a seal of the sealant tie layer to itself, the film diffuses or dissipates the stress throughout each of the sealant skin layer and first tie layer by improved plastic deformation or compliance, instead of leaving the stress concentrated in the sealant tie layer. A seal that dissipates the stress may generally facilitate a stronger seal than the same film having a concentrated stress region.

It is contemplated that seal strength benefit may be realized in the seal area through improved bonding interaction between the core, tie, and seal layers. This improved bonding is a result of improved flowability of the soft polymer within the first tie layer comprising the soft polymer and at the interface with the layers adjacent to the soft-polymer-containing first tie layer, resulting in improved interlayer molecular intermingling at the layer interfaces. Benefits of the improved flowability manifest film improvement during both co-extrusion of the multilayer film and then again during sealing operations.

As a result of the improved elasticity or compliance, the multilayer film of this invention may also provide improvements in seal strength integrity and improved hermetic sealing, particularly in the more leak-prone folds, creases, and seams in the seal area, due to the improved film conformability during sealing.

In still yet another embodiment, the multilayer film is a cavitated, white, or opaque film due to the addition of a cavitating agent to the core layer and/or pigments such as titanium dioxide to one or more of the layers. In any embodiment of this invention, the multilayer film may be used stand-alone as monoweb packaging film, laminated to other films or substrates, or formed into a package or pouch to enclose or contain a product or material.

The minimum seal temperature of the multilayer film of this invention is less than or equal to 120° C., preferably less than or equal to 93° C., more preferably less than or equal to 82° C., even more preferably less than or equal to 77° C., when a seal is formed by a crimp sealer at 200 g/25 mm weight, 60 psi pressure, and 0.75 second dwell time of the sealant layer to itself; and in other embodiments, within a range of from 50° C. or 60° C. to 100° C. or 110° C. or 120° C. or 130° C. Such minimum sealing temperatures are determined in accordance with methods described herein.

The seal strength of the multilayer film of this invention is greater than 1100 grams/inch (433 g/cm); preferably greater than 1200 grams/inch (472 g/cm); and most preferably, 1300 grams/inch (512 g/cm) or higher; or within a range of from 900 (354) or 1000 (394) or 1100 grams/inch (433 g/cm) to 1500 (590) or 1700 (669) or 2000 grams/inch (787) when seals are formed using the crimp sealer at a temperature of less than or equal to 120° C. Such seal strength is determined in accordance with the methods described herein.

Soft Polymer

"Impact" ("soft") polymers will most commonly include those polymers having a flexural modulus (ASTM D790) of less than 80 kpsi or 50 kpsi or 20 kpsi; or within a range of from 10 kpsi or 20 kpsi or 30 kpsi to 100 kpsi or 200 kpsi or 250 kpsi. In some preferred embodiments, the soft polymers will be a polyolefin co- or terpolymer and may have a melting point temperature $T_m$ equal to or less than 142° C. or 120° C. or 200° C.; or within a range of from 40° C. or 50° C. or 60° C. to 100° C. or 110° C. or 120° C. or 130° C. The soft resins may also be defined as those resins having a Vicat softening point (VSP) (ASTM D1525) of less than or equal to 105° C., more preferably of less than or equal to 80° C., and for some embodiments, most preferably of less than or equal to 65° C.

Acceptable soft polymers include polymer resins that are less stiff, have lower modulus, are more flexible and elastic, and tend to have a more plastic stress-strain behavior than the more common polymer film-forming resins such as isotactic polypropylene and high density polyethylene. Acceptable polymer resins also include, but are not limited to, resins having more elastic or amorphous-type functional properties as opposed to more crystalline properties.

For further example, another acceptable resin group of "soft" polymers includes, but is not limited to, impact copolymers or heterophasic polymer blends that typically contain from 5 wt % to 25 wt % of an elastomeric compound to incorporate rubber-like properties to the normally rigid backbone of polypropylene-based polymers. Other heterophasic copolymers, such as those made by Basell's Catalloy™ process may contain over 25 wt % and even in excess of 50 wt % of elastomeric compound. For the exemplary Catalloy™ or impact polymers, such as Adflex™ T100F, the elastomeric component of the impact polymer may include, but is not limited to, ethylene-propylene, propylene-butylene, acrylonitrile-chloroprene copolymer, acrylonitrile-isoprene copolymer, butadiene-acrylonitrile copolymer, chlorinated polyethylene, chlorosulfonated polyethylene, ethylene-ether polysulfite, ethylene-ethyl acrylate copolymer, ethylene polysulfite, ethylene-propylene copolymer, ethylene-propylene-diene terpolymer, fluoroelastomer, fluorosilicone, hexafluoropropylene-vinylidene fluoride copolymer, isobutene-isoprene copolymer, organopolysiloxane, acrylic ester-butadiene copolymer, polybutadiene, polychloroprene, polyepichlorohydrin, polyisobutene, polyisoprene, polyurethane, styrene-butadiene copolymer, styrene-chloroprene copolymer, polyethylene-butyl graft copolymer, styrene-butadiene-styrene triblock polymer, and blends thereof. The impact copolymer is preferably a propylene-based copolymer having from 10 wt % to 30 wt % or 40 wt % or 50 wt %, by weight of the polymer, of ethylene or butene derived units, those units with propylene units preferably forming elastomeric regions of the polymer in a continuous phase primarily of polypropylene.

Other acceptable soft polymers comprise a PB copolymer such as Shell SRD4-141 (commercially available from Shell Chemical Company); elastomers, such as Vistamaxx™ 1000, -3000, -3020, -3980, -6102, and -6202 (commercially available from ExxonMobil Chemical); and EPB terpolymer such as XPM7500, -7700, -7790, and -7800 (commercially available from Japan Polypropylene Chemical Company).

Core Layer

The core layer of the embodiments of this invention has a first side and a second side and comprises a core polymer, such as, for example, a propylene polymer. In some embodiments, the core layer polymer may comprise an isotactic propylene homopolymer (iPP). Examples of a suitable iPP are Total 3371 (commercially available from Total Chemical Company) and Exxon 4612 (commercially available from ExxonMobil Chemical Company). In some embodiments, the core layer polymer may comprise a high crystallinity polypropylene homopolymer or a polypropylene homopolymer. An example of a suitable high crystallinity polypropylene homopolymer is Total 3270 (commercially available from Total Petrochemical), and a suitable polypropylene homopolymer is Exxon 4712 (commercially available from ExxonMobil Chemical Company).

The core layer may further comprise at least one additive such as an opacifying agent, void-initiating particles, a hydrocarbon resin, or combinations thereof. Preferably, the total amount of additives in the core layer comprises up to 20 wt % of the core layer, but some embodiments may comprise additives in the core layer in an amount up to 30 wt % of the core layer.

An opacifying or coloring agent may be used in the core layer, such as iron oxide, carbon black, aluminum, titanium dioxide ($TiO_2$), talc, and combinations thereof.

Cavitating or void-initiating particles may be added to the core layer polymer to create an opaque film. The cavitating or void-initiating additives include any suitable organic or inorganic material that is incompatible with the core layer polymer material at the temperature of biaxial orientation. Examples of suitable void-initiating particles are polybutylene teraphthalate (PBT), nylon, solid or hollow pre-formed glass spheres, metal beads or spheres, ceramic spheres, calcium carbonate, talc, chalk, or combinations thereof. The average diameter of the void-initiating particles typically may be from 0.1 μm to 10 μm. These void-initiating particles may be present in the core layer at less than 30 wt %; preferably less than 20 wt %; most preferably in the range of from 2 wt % to 10 wt %, based on the total weight of the core layer.

The core layer, the first tie layer, and/or second tie layer may include a hydrocarbon resin. Hydrocarbon resins may serve to enhance or modify the modulus, improve processability, or improve the barrier properties of the film. Examples of such hydrocarbon resins may be found in U.S. Pat. No. 5,667,902, incorporated herein by reference. The resin may be a low molecular weight hydrocarbon, which is compatible with the core polymer. Optionally, the resin may be hydrogenated. The resin may have a number average molecular weight greater than 5000; preferably greater than 2000; most preferably in the range of from 500 or 1000 g/mole to 1000 or 2000 or 5000 g/mole.

The resin can be natural or synthetic and may have a softening point in the range of from 60° C. to 180° C. Examples of hydrocarbon resins include, but are not limited to, petroleum resins, terpene resins, styrene resins, and cyclopentadiene resins.

Examples of hydrocarbon resins that may be used include aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and mixtures of two or more thereof.

Hydrocarbon resins that may be suitable for use as described herein include EMPR 120, 104, 111, 106, 112, 115, EMFR 100 and 100A, ECR-373, and Escorez™ 2101, 2203, 2520, 5380, 5600, 5618, 5690, available from ExxonMobil Chemical Company; ARKON™ M90, M100, M115, and M135 and SUPER ESTER™ rosin esters available from Arakawa Chemical Company of Japan; SYLVARES™ phenol modified copolymer of styrene and α-methyl styrene resins, styrenated terpene resins, ZONATAC™ terpend-aromatic resins, and terpene phenolic resins available from Arizona Chemical Company; SYLVATAC™ and SYLVALITE™ rosin esters available from Arizona Chemical Company; NORSOLENE™ aliphatic aromatic resins available from Cray Valley of France; DERTOPHENE™ terpene phenolic resins available from DRT Chemical Company of Landes, France; EASTOTAC™ resins, PICCOTAC™ $C_5/C_9$ resins, REGALITE™ and REGALREZ™ aromatic and REGALITE™ cycloaliphatic/aromatic resins available from Eastman Chemical Company of Kingsport, Tenn.; WINGTACK™ ET and EXTRA available from Goodyear Chemical Company; FORAL™, PENTALYN™, and PERMALYN™ rosins and rosin esters available from Eastman Chemical Company; QUINTONE™ acid modified $C_5$ resins, $C_5/C_9$ resins, and acid modified $C_5/C_9$ resins available from Nippon Zeon of Japan; LX™ mixed aromatic/cycloaliphatic resins available from Neville Chemical Company; CLEARON™ hydrogenated terpene aromatic resins available from Yasuhara; and Piccolyte. The preceding examples are illustrative and not limiting.

One particular hydrocarbon resin may be referred to as a saturated alicyclic resin. Such resins, if used, may have a softening point in the range of from 85° C. to 140° C., or preferably in the range of 100° C. to 140° C., as measured by the ring and ball technique. Examples of commercially available saturated alicyclic resins are Arkon-P™ (commercially available from Arakawa Forest Chemical Industries, Ltd., of Japan).

The amount of such hydrocarbon resins, either alone or in combination, in the core layer is less than 20 wt %, preferably in the range of from 1 wt % to 5 wt %, based on the total weight of the layer. Also, the core layer may comprise antistatic agents or migratory slip agents, such as fatty amides.

The core layer of embodiments of this invention preferably has a thickness in the range of from 10 µm to 50 µm; more preferably from 12 µm to 35 µm; most preferably from 15 µm to 25 µm.

First Tie Layer

The first tie layer has a first side and a second side, the second side is on the first side of the core layer and is preferably contiguous to the surface of the first side of the core layer. The first tie layer comprises an impact (i.e., soft) polymer. In some preferred embodiments, the first tie layer comprises 100 wt % soft polymer, and more preferably, within the range of from 25 or 35 or 45 wt % to 65 or 75 or 85 or 95 wt %, by weight of the tie layer. The impact copolymer is preferably a propylene-based copolymer having from 10 wt % to 30 wt %, by weight of the polymer, of ethylene or butene derived units. A so-called "tie layer polymer" may also be present, and may make up the remainder of the tie layer in combination with the soft polymer. When the tie layer polymer is present, the tie layer polymer is preferably present in an amount of from 75 or 65 or 55 wt % to 45 or 35 or 25 wt % of the first tie layer. Amounts of the tie layer polymer of less than 25 wt % are also permissible, depending upon the desired properties for the multilayer film product. The optional tie layer polymer may comprise at least one of a $C_2$ to $C_8$ alpha-olefin homo-, co-, or terpolymer or a metallocene catalyzed homo-, co-, terpolymer, metallocene catalyzed random copolymer, an impact copolymer, or blends thereof. Preferably, the tie layer polymer has a flexural modulus (ASTM D790) of greater than 200 kpsi or 250 kpsi or 300 kpsi or 350 kpsi or 400 kpsi.

The tie layer polymer component may include, for example, ethylene- and propylene-based polymers including, but not limited to, polyolefins selected from the group consisting of propylene (PP) homopolymer, ethylene-propylene (EP) copolymer, ethylene-propylene-butylene (EPB) terpolymer, propylene-butylene (PB) copolymer, and blends thereof.

In addition to the exemplary heterophasic or Catalloy™ impact-type polymers, numerous other polymers or polymer blends are acceptable as the soft polymer. For example, other acceptable polymers may include block copolymers, copolymers and terpolymers including $C_2$ to $C_8$ alpha-olefins, and random copolymers. The acceptable soft polymers may be the product of Ziegler-Natta or metallocene catalysis.

Preferably, the first tie layer is comprised of at least one of an isotactic polypropylene, an impact copolymer (or "soft polymer"), or blends thereof as described herein.

The thickness of the first tie layer is typically in the range of from 0.5 µm to 5.0 µm; preferably from 0.50 µm to 4 µm.

Second Tie Layer

The second tie layer has a first side and a second side, the first side of the second tie layer is on the second side of the core layer, and is preferably contiguous to the surface of the second side of the core layer. The second tie layer comprises a tie layer polymer comprising at least one of a $C_2$ to $C_8$ alpha-olefin homo-, co-, or terpolymer, a metallocene catalyzed homo-, co-, or terpolymer comprising propylene, and blends thereof.

The thickness of the second tie layer is typically in the range of from 0.5 µm to 5.0 µm; preferably from 0.5 µm to 4 µm.

Sealant Skin Layer

The sealant skin layer of the present invention has a first side and a second side, the second side of the sealant layer is on the first side of the first tie layer. In preferred embodiments, the sealant layer is contiguous to the first tie layer. The sealant layer includes a polymer blend that is suitable for heat-sealing or bonding to itself when crimped between heated crimp-sealer jaws. The sealant skin layer of the present invention must comprise a blend of from 25 wt % to 75 wt % MDPE having a density of from 0.910 g/cm$^3$ to 0.950 g/cm$^3$, and other ranges as described above, from 25 wt % to 75 wt % $C_2$ to $C_6$ random copolymer or terpolymer as described above, and from 0.3 wt % to 1 wt % antiblock agent. The $C_2$ to $C_6$ random copolymer or terpolymer may be selected from, for example, the group consisting of ethylene-propylene (EP), propylene-butylene (PB), ethylene-propylene-butylene (EPB), and combinations thereof. It is preferable that the sealant skin layer does not contain silicone slip additives or "matte" resins in order to achieve the benefits associated with the present invention. Thus, preferably silicon slip additives are absent from the sealant skin layer.

The antiblock agent for use in the sealant skin layer may be selected from cross-linked silicone, amorphous silica, polymethyl methacrylate, and combinations thereof. Most preferably, silicon-based additives are absent from the sealant skin layer.

The thickness of the sealant skin layer may be in the range of from 0.5 µm to 4.0 µm; preferably 0.5 µm to 3 µm; and most preferably 1 µm to 2.5 µm. In some film embodiments, the sealant skin layer thickness may be from 0.5 µm to 2 µm; or 0.5 µm to 1 µm.

Second Skin Layer

A second or outer skin layer is provided on the opposite side of the core layer from the sealant skin layer. The second skin layer has a side on the second side of the second tie layer and may be contiguous to the second side of the second tie layer. The second skin layer comprises a polymer selected from the group consisting of polyethylene (PE), polypropylene (PP), ethylene-propylene (EP) copolymer, propylene-butylene (PB) copolymer, ethylene-propylene-butylene (EPB) terpolymer, ethylene-vinyl alcohol (EVOH) polymer, and blends thereof. The second skin layer may be provided to improve the multilayer film's barrier properties, processability, printability, and compatibility for metallization, coating, and lamination to other films or substrates.

More specifically, the second skin layer comprises at least one polymer selected from the group consisting of a PE polymer, a PP polymer, an EP copolymer, a PB copolymer, an EPB terpolymer, an ethylene-vinyl alcohol (EVOH) polymer, and blends thereof. In an embodiment, the PE polymer is high density polyethylene, such as HDPE, such as M-6211 and M-6030 (commercially available from Equistar Chemical Company); and HD-6704.67 (commercially available from ExxonMobil Chemical Company). In an embodiment, the polymer is an EP copolymer, such as Fina 8573 (commercially available from Fina Oil Company), or a PB copolymer, such as Borealis TD908BF. For coating and printing functions, the second skin layer may comprise a co- or terpolymer that has been surface treated. For metallizing or barrier properties, an HDPE, PP, or EVOH may be preferred. A suitable EVOH copolymer is Eval G176B (commercially available from Kuraray Company Ltd. of Japan).

The thickness of the second skin layer depends upon the intended function of the skin layer, but is typically in the range of from 0.5 μm to 4.0 μm; preferably from 0.5 μm to 3.0 μm; and in many embodiments most preferably from 0.5 μm to 2.0 μm. Also, in thinner film embodiments, the second skin layer thickness may range from 0.5 μm to 1.0 μm; or 0.5 μm to 0.75 μm.

Coatings

In some embodiments, one or more coatings, such as for barrier, printing, and/or processing, may be applied to the second skin layer of the multilayer film of this invention. Such coatings may include acrylic polymers, such as ethylene acrylic acid (EAA), ethylene methyl acrylate copolymers (EMA), polyvinylidene chloride (PVDC), poly(vinyl)alcohol (PVOH), and ethylene (vinyl)alcohol EVOH. The coatings are preferably applied by an emulsion coating technique, but may also be applied by co-extrusion and/or lamination.

The PVDC coatings that are suitable for use with the multilayer film of this invention are any of the PVDC compositions employed as coatings in film manufacturing operations, e.g., any of the PVDC materials described in U.S. Pat. Nos. 4,214,039; 4,447,494; 4,961,992; 5,019,447; and 5,057,177, each incorporated herein by reference.

Known vinyl alcohol-based coatings, such as PVOH and EVOH, that are suitable for use with the multilayer film of this invention include VINOL 125 or VINOL 325 (both commercially available from Air Products, Inc.). Other PVOH coatings are described in U.S. Pat. No. 5,230,963, incorporated herein by reference.

Before applying the coating composition to the appropriate substrate, the surface of the film may be treated as noted herein to increase its surface energy. This treatment can be accomplished by employing known techniques, such as, flame treatment, plasma, corona discharge, chlorination, i.e., exposure of the film surface to gaseous chlorine, treatment with oxidizing agents such as chromic acid, hot air or steam treatment, and the like. Although any of these techniques are effectively employed to pre-treat the film surface, a frequently preferred method is corona discharge, an electronic treatment method which includes exposing the film surface to a high voltage corona discharge while passing the film between a pair of spaced electrodes. After treatment of the film surface, the coating composition is then applied. Any layer of the film may be treated in such a manner, most preferably the first skin layer on its outer surface (not facing the tie and/or core layer), and/or the second skin layer on its outer surface.

An intermediate primer coating may be applied to the multilayer film of this invention. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy and poly(ethylene imine) (PEI) materials. U.S. Pat. Nos. 3,753,769; 4,058,645; and 4,439,493, each incorporated herein by reference, disclose the use and application of such primers. The primer provides an overall adhesively active surface for thorough and secure bonding with the subsequently applied coating composition and can be applied to the film by conventional solution coating means, for example, by roller application.

The coating composition can be applied to the film as a solution, one prepared with an organic solvent such as an alcohol, ketone, ester, and the like. However, since the coating composition can contain insoluble, finely divided inorganic materials which may be difficult to keep well dispersed in organic solvents, it is preferable that the coating composition be applied to the treated surface in any convenient manner, such as by gravure coating, roll coating, dipping, spraying, and the like. Any excess aqueous solution can be removed by squeeze rolls, doctor knives, and the like.

The film can be stretched in the machine direction, coated with the coating composition and then stretched perpendicularly in the transverse direction. In yet another embodiment, the coating can be carried out after biaxial orientation is completed.

The coating composition may be applied in such amount that there will be deposited (upon drying) a smooth, evenly distributed layer, generally on the order of from 0.2 μm to 5 μm thickness (equivalent to 0.2 to 3.5 grams per 1000 sq. in. of film). The coating on the film may subsequently be dried by hot air, radiant heat, or by any other convenient means.

Film Orientation

The embodiments of this invention include possible uniaxial or biaxial orientation of the multilayer film. Orientation in the direction of extrusion is known as machine direction orientation (MD), orientation perpendicular to direction of extrusion is known as transverse direction (TD). Orientation may be accomplished by stretching or pulling a blown film in the MD, using a blow-up ratio to accomplish TD orientation. Blown films or cast films may also be oriented by a tenter-frame orientation subsequent to the film extrusion process, again in one or both directions. Orientation may be sequential or simultaneous, depending upon the desired film features. Orientation ratios may generally be in the range of 1:3 to 1:6 in the machine direction (MD) or 1:4 to 1:10 in the transverse direction (TD). Preferred orientation ratios are commonly from between three to six times in the machine direction and between four to ten times the extruded width in the transverse direction.

Metallization

The exterior surface of the second skin layer and/or the sealant layer (or the core layer if no second skin layer is present) may be metallized. Such layers may be metallized using conventional methods, such as vacuum metallization by deposition of a metal layer such as aluminum, copper, silver, chromium, or mixtures thereof.

Other Additives

Other additives that may be added to the multilayer film of this invention, include, but are not limited to, pigments, colorants, antioxidants, antiozonants, antifogs, antistatics, and fillers such as diatomaceous earth, combinations thereof, and the like. Such additives may be used in effective amounts, which vary depending upon the property required, and are typically selected from one or more of antiblock, slip additive, anti-oxidant additive, moisture barrier additive, or gas barrier additive. It is noted that silicone slip additive must not be added to the sealant skin layer of the present film.

Useful anti-static additives that may be used in amounts ranging from 0.05 wt % to 3 wt %, based upon the weight of the layer, include alkali metal sulfonates, polyether-modified polydiorganosiloxanes, polyalkylphenylsiloxanes, and tertiary amines.

Antiblocking agents, such as a silica-based product, such as, Sylobloc 44 (commercially available from Grace Davison Products); polymethyl methacrylate (PMMA) particles, such as, EPOSTAR™; or polysiloxanes, such as, TOSPEARL™ are also contemplated. Such antiblocking agent comprises an effective amount up to 10,000 ppm, for example up to 3,000 ppm, of the weight of the layer to which it is added. Preferably, however, silicon-based anti-blocking agents are absent from the film and film layers.

Conventional slip additives include higher aliphatic acid amides, higher aliphatic acid esters, waxes, silicone oils, and metal soaps. Such slip additives may be used in amounts ranging from 0.1 wt % to 2 wt % based on the total weight of the layer to which it is added. An example of a slip additive that may be useful for this invention is erucamide. Again, it is noted that slip additive must not be added to the sealant skin layer of the present film.

The second skin layer may also include a non-migratory slip agent, such as polymethyl methacrylate (PMMA). The non-migratory slip agent may have a (mean) particle size in the range of from 0.5 μm to 4 μm, or more preferably 0.5 μm to 3 μm, depending upon layer thickness and desired slip properties. Alternatively, the size of the particles in the non-migratory slip agent, such as PMMA, may be greater than 100% of the thickness of the second skin layer containing the slip agent, or greater than 120% of the thickness of the layer, or up to 200% or more of the thickness of the layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip additives are contemplated, including PMMA resins, such as EPOSTAR™, manufactured by Nippon Shokubai Co., Ltd. Other commercial sources of suitable materials are also known. "Non-migratory" means that these particulates do not generally change location throughout the layers of the film in the manner of the migratory slip agents.

Use of conventional polydialkyl siloxane such as silicone oil or gum additive having a viscosity of 10,000 to 2,000,000 centistokes is also contemplated. Preferably, these siloxanes are absent from the sealant skin layer.

Useful antioxidants include phenolic antioxidants, such as Irganox 1010 (commercially available from Ciba-Geigy Company). Such antioxidants are generally used in amounts ranging from 0.1 wt % to 2.0 wt %, based on the total weight of the layer to which it is added.

Barrier additives may be used in effective amounts and may include low molecular weight resins, hydrocarbon resins, particularly petroleum resins, styrene resins, cyclopentadiene resins, and terpene resins. It is noted that "matte" resin additive must not be added to the sealant skin layer of the present film.

Optionally, the second skin layer may be compounded with a wax or coated with a wax-containing coating, for lubricity, in amounts ranging from 2 wt % to 15 wt % based on the total weight of the layer to which it is added. Any conventional wax, such as, but not limited to, Carnauba™ wax (available from Michelman Corporation, Cincinnati, Ohio) that is useful in thermoplastic films is contemplated.

Heat Seals

Heat seals useful in packaging are commonly lap, fin, or crimp seals. Most frequently, vertical form fill and seal and/or horizontal form fill and seal (VFFS and/or HFFS, respectively) useful in snack packaging will employ a fin seal and two crimp seals. For extended shelf life, a hermetic seal is desirable. A hermetic seal is generally one that does not permit the passage of gasses.

Methods and Uses

The multilayer film of the present invention is useful as substantially stand-alone film web or it may be coated, metallized, and/or laminated to other film structures. Multilayer film of this invention may be prepared by the steps of co-extruding the film layers according to the description of this specification, orienting and preparing the film for intended use such as by coating, printing, slitting, or other converting methods. A preferred method comprises co-extruding, then casting and orienting, or blowing a five layer film.

A method for preparing the multilayer film according to the present invention comprises the steps of co-extruding at least: (a) a core layer having a first side and a second side, said core layer comprising at least one core polymer; (b) a first tie layer having a first side and a second side, the second side of the first tie layer on the first side of said core layer, said first tie layer comprising an impact copolymer and, optionally, a tie layer polymer, the optional tie layer polymer comprising at least one of a $C_2$ to $C_8$ alpha-olefin homo-, co-, or terpolymer, a metallocene catalyzed homo-, co-, or terpolymer comprising propylene, and blends thereof; (c) a second tie layer having a first side and a second side, the first side of the second tie layer on the second side of said core layer, said second tie layer comprising a tie layer polymer comprising at least one of a $C_2$ to $C_8$ alpha-olefin homo-, co-, or terpolymer, a metallocene catalyzed homo-, co-, or terpolymer comprising propylene, and blends thereof; (d) a sealant skin layer having a side on the first side of the first tie layer, said sealant skin layer comprising a blend of from 25 wt % to 75 wt % MDPE having a density of from 0.910 g/cm$^3$ to 0.950 g/cm$^3$, from 25 wt % to 75 wt % $C_2$ to $C_6$ random copolymer or terpolymer and from 0.3 wt % to 1 wt % antiblock agent; and (e) a second skin layer having a side on the second side of the second tie layer, said second skin layer comprising a polymer selected from the group consisting of polyethylene (PE), polypropylene (PP), ethylene-propylene (EP) copolymer, propylene-butylene (PB) copolymer, ethylene-propylene-butylene (EPB) terpolymer, ethylene-vinyl alcohol (EVOH) polymer, and blends thereof.

The prepared multilayer film may be used as a flexible packaging film, such as to package an article or good, such as a food item or other product. In some applications, the film may be formed into a pouch type of package, such as may be useful for packaging a beverage, liquid, granular, or dry-powder product.

Therefore, a method for using the multilayer film structure comprises the steps of: (i) co-extruding at least: (a) a core layer having a first side and a second side, said core layer comprising at least one core polymer; (b) a first tie layer having a first side and a second side, the second side of the first tie layer on the first side of said core layer, said first tie layer comprising an impact copolymer and, optionally, a tie layer polymer, the optional tie layer polymer comprising at least one of a $C_2$ to $C_8$ alpha-olefin homo-, co-, or terpolymer, a metallocene catalyzed homo-, co-, or terpolymer comprising propylene, and blends thereof; (c) a second tie layer having a first side and a second side, the first side of the second tie layer on the second side of said core layer, said second tie layer comprising a tie layer polymer comprising at least one of a $C_2$ to $C_8$ alpha-olefin homo-, co-, or terpolymer, a metallocene catalyzed homo-, co-, or terpolymer comprising propylene, and blends thereof; (d) a sealant skin layer having a side on the first side of the first tie layer, said sealant skin layer comprising a blend of from 25 wt % to 75 wt % MDPE having a density of from 0.910 g/cm$^3$ to 0.950 g/cm$^3$, from 25 wt % to 75 wt % $C_2$ to $C_6$ random copolymer or terpolymer and from 0.3 wt % to 1 wt % antiblock agent; and (e) a second skin layer having a side on the second side of the second tie layer, said second skin layer comprising a polymer selected from the group consisting of polyethylene (PE), polypropylene (PP), ethylene-propylene (EP) copolymer, propylene-butylene (PB) copolymer, ethylene-propylene-butylene (EPB) terpolymer, ethylene-vinyl alcohol (EVOH) polymer, and blends thereof; (ii) enclosing an article within at least a portion of the co-extruded multilayer film; (iii) engaging a first portion of the sealant skin layer with a second portion of the sealant skin layer at a seal area; and (iv) applying pressure and heat at the seal area to cause the first portion of the sealant skin layer to engage with the second portion of the sealant skin layer to create at least one of a fin seal, a lap seal, and a crimp seal in the seal area.

Of course, this method may comprise stretching the co-extruded product of step (i) prior to step (ii) such that the co-extruded product is biaxially oriented form three (3) to six (6) times the extruded length in the machine direction (MD) and from four (4) to ten (10) times the extruded width in the transverse direction (TD).

Property Measurement

Seal strength is a measure of the force required to separate a test strip of a material containing a seal and identifies the mode of failure of the test strip. The seal strength is evaluated on an untreated film surface that is sealed to itself.

Minimum seal temperature is a measure of the sealing property of a film and is the temperature at which a heat seal may support a given force.

Seal strength may be determined using sealing devices such as a LAKO™ Heat Sealer (Model SL-10). Also, the seal strength of flexible barrier materials may be determined according to the standard testing method of ASTM F 88-00.

A LAKO Heat Sealer (Model SL-10), commercially available from Lako Tool & Manufacturing, Inc. of Perrysburg, Ohio, may be used to form a seal and evaluate its seal strength. The LAKO Heat Sealer is an automated film testing device which is capable for forming a film seal, determining the seal strength, and generating a seal profile from film samples. The operating range is from ambient to 199° C., sealing pressure of 6.5 psi to 390 psi, e.g., 60 psi, and a dwell time of 0.2 to 20 seconds, e.g., 0.75 second.

The minimum seal temperature is determined as follows: Heat seals are formed using the above heat sealer at temperatures that are raised incrementally. The minimum seal temperature is reached when one temperature yields a seal value of less than a specified grams/inch peel force and the next temperature yields a seal value of greater than or equal to the specified grams/inch (25 mm) peel force. In the case of the LAKO SL-10 sealer, the specified peel force is 200 grams per inch.

Die lip buildup (DLBU) may be determined using a one-inch extruder with L/D (length/diameter) of 20/1. A die is attached to the extruder which forms a strand of 3 mm diameter. The extruder is set to a temperature of 245° C. to 265° C. and the polymer is extruded at a rate of 4500 g/hr. As the polymer exits the strand die the residue that is left on the die is observed and a severity rating is determined. In a manufacturing facility it is undesirable to have DLBU because the residue will cause film splits when it dislodges from the extruder die.

EXAMPLES

The multilayer film of the present invention will be further described with reference to the following non-limiting examples. All weight percentages specified herein are based on the weight of the respective film layer, unless specified otherwise.

Example 1

A five-layer film having an A/B/C/D/E structure was prepared. The A layer was an 8 gauge (2 μm) sealant skin layer comprising 60 wt % polyethylene having a density of 0.942 g/cm$^3$ (XOM 3404.48), 39.5 wt % EPB terpolymer (Japan Polypropylene 7790), and 0.5 wt % antiblock (Epostar MA1010). The B layer was a 20 gauge (5 μm) first tie layer comprising 100 wt % impact (soft) copolymer Adflex T100F. The C layer was a 64 gauge (16 μm) core layer comprising 80 wt % high crystallinity polypropylene (Total 3270) and 20 wt % polypropylene homopolymer (Exxon 4712). The D layer was a 5 gauge (1.25 μm) second tie layer comprising 100 wt % polypropylene homopolymer (Exxon 4712). The E layer was a 3 gauge (0.75 μm) second skin layer comprising 100 wt % propylene-butylene (PB) copolymer (Borealis TD908BF). The extruded film was biaxially oriented by stretching in the machine direction 5 times extruded length, and in the transverse direction 8 times extruded width.

Samples of the oriented multilayer film of Example 1 were evaluated for various important properties. The results of the evaluations are as follows: Static COF was 0.61 and Kinetic COF was 0.44 determined by testing method ASTM D1894. Seal strength following use of the LAKO™ SL-10 crimp sealer of 200 grams/25 mm, 60 psi pressure, and 0.75 second dwell time, with cooling time of 20 seconds, was 1,300 grams/25 mm for a seal formed on the crimp sealer at a minimum seal temperature of 122° C. Haze was 13.6% determined by testing method ASTM D1003. Gloss on the first side was measured at 45° C. of 49.9% determined by testing method ASTM D2457. The DLBU for this film proved to be "None" after six consecutive hours.

Example 2

Another five-layer film having an A/B/C/D/E structure was prepared. The A layer was an 8 gauge (2 μm) sealant skin layer comprising 60 wt % polyethylene having a density of 0.912 g/cm$^3$ (Exceed 1012CA), 39.5 wt % terpolymer (Japan Polypropylene 7790), and 0.5 wt % antiblock (Epostar MA1010). The B layer was a 20 gauge (5 μm) first tie layer comprising 100 wt % impact copolymer Adflex T100F. The C layer was a 64 gauge (16 μm) core layer comprising 80 wt % high crystallinity polypropylene (Total 3270) and 20 wt % polypropylene homopolymer (Exxon 4712). The D layer was a 5 gauge (1.25 μm) second tie layer comprising 100 wt % polypropylene homopolymer (Exxon 4712). The E layer was a 3 gauge (0.75 μm) second skin layer comprising 100 wt % propylene-butylene (PB) copolymer (Borealis TD908BF). The extruded film was biaxially oriented by stretching in the machine direction 5 times extruded length, and in the transverse direction 8 times extruded width.

Samples of the oriented multilayer film of Example 2 were evaluated for various important properties by the same methods as for the samples of Example 1. The results of the evaluations were as follows: Static COF was 0.94. Kinetic COF was 0.54. Seal strength following use of the crimp sealer of 200 grams/25 mm, 60 psi pressure, and 0.75 second dwell time, with cooling time of 20 seconds, was 1,300 grams/25 mm for a seal formed on the crimp sealer at a minimum seal temperature of 112° C. Haze was 5.29%. Gloss was measured at 45° C. of 74%. The DLBU for this film proves to be "None" after six consecutive hours.

Example 3

Comparative Example showing that deleting or substituting a seal skin component, i.e., the MDPE or terpolymer, results in failure/less desirable film. Another five-layer film having an A/B/C/D/E structure was prepared. The A layer was an 8 gauge (2 μm) sealant skin layer comprising a matte HDPE blend (density of 0.960 g/cm³) and 0.5 wt % antiblock (Epostar MA1010). The B layer was a 20 gauge (5 μm) first tie layer comprising 100 wt % impact copolymer Adflex T100F. The C layer was a 64 gauge (16 μm) core layer comprising 80 wt % high crystallinity polypropylene (Total 3270) and 20 wt % polypropylene homopolymer (Exxon 4612). The D layer was a 5 gauge (1.25 μm) second tie layer comprising 100 wt % polypropylene homopolymer (Exxon 4712). The E layer was a 3 gauge (0.75 μm) second skin layer comprising 100 wt % propylene-butylene (PB) copolymer (Basell Clyrell RC1601). The extruded film was biaxially oriented by stretching in the machine direction 5 times extruded length, and in the transverse direction 8 times extruded width.

Samples of the oriented multilayer film of Example 2 were evaluated for various important properties by the same methods as for the samples of Example 1. The results of the evaluations were as follows: Static COF was 0.72. Kinetic COF was 0.39. Seal strength following use of the crimp sealer of 200 grams/25 mm, 60 psi pressure, and 0.75 second dwell time, with cooling time of 20 seconds, was 1,300 grams/25 mm for a seal formed on the crimp sealer at a minimum seal temperature of 119° C. Haze was 49.9%. Gloss measured at 45° was approximately 15%. The DLBU for this film proves to be "Heavy" after six consecutive hours. In this example, the die-lip build-up was too high for reasonable manufacturing.

Example 4

Another five-layer film having an A/B/C/D/E structure was prepared. The A layer was an 8 gauge (2 μm) sealant skin layer comprising 100% terpolymer (Japan Polypropylene 7794, density of 0.910 g/cm³), and 0.5 wt % antiblock (Epostar MA1010). The B layer was a 20 gauge (5 μm) first tie layer comprising 100 wt % impact copolymer Adflex T100F. The C layer was a 64 gauge (16 μm) core layer comprising 80 wt % high crystallinity polypropylene (Total 3270) and 20 wt % polypropylene homopolymer (Exxon 4612). The D layer was a 5 gauge (1.25 μm) second tie layer comprising 100 wt % polypropylene homopolymer (Exxon 4712). The E layer was a 3 gauge (0.75 μm) second skin layer comprising 100 wt % propylene-butylene (PB) copolymer (Basell Clyrell RC1601). The extruded film was biaxially oriented by stretching in the machine direction 5 times extruded length, and in the transverse direction 8 times extruded width.

Samples of the oriented multilayer film of Example 4 were evaluated for various important properties by the same methods as for the samples of Example 1. The results of the evaluations were as follows: Static COF was 0.98. Kinetic COF was 0.78. Seal strength following use of the crimp sealer of 200 grams/25 mm, 60 psi pressure, and 0.75 second dwell time, with cooling time of 20 seconds, was 1,300 grams/25 mm for a seal formed on the crimp sealer at a minimum seal temperature of 95.6° C. Haze was 4.1%. Gloss measured at 45° was approximately 85%. The DLBU for this film proves to be "None" after six consecutive hours. In this case, the kinetic COF was too high for good machining on most packaging machines.

In the above examples, "minimum seal temperature" (MST) is the average minimum seal temperature required to affect seal strength of 200 grams per inch with a crimp seal applied at 60 psi of pressure and 0.75 seconds of dwell time.

Of the resins used in the above examples, Exxon 4712 is an isotactic polypropylene homopolymer available from Exxon-Mobil Chemical. Adflex T100F is an EP copolymer from Basell Polymers.

While the invention has been described in terms of specific embodiments, those skilled in the art will appreciate that various modifications and variations to these embodiments can be made without departing from the spirit and scope of this invention. For example, while certain film layers are exemplified as being comprised of specific polymer blends and additives, along with certain arrangement of layers within the film, other compositions and arrangements are also contemplated. Additionally, while packaging is discussed as among the uses for embodiments of our inventive films, other uses, such as labeling and printing, are also contemplated.

What is claimed is:

1. A multilayer film structure comprising (a) a core layer having a first side and a second side, said core layer comprising at least one core polymer; (b) a first tie layer having a first side and a second side, the second side of the first tie layer on the first side of said core layer, said first tie layer comprising an impact copolymer and, optionally, a tie layer polymer, the optional tie layer polymer comprising at least one of a $C_2$ to $C_8$ alpha-olefin homo-, co-, or terpolymer, a metallocene catalyzed homo-, co-, or terpolymer comprising propylene, and blends thereof; (c) a second tie layer having a first side and a second side, the first side of the second tie layer on the second side of said core layer, said second tie layer comprising a tie layer polymer comprising at least one of a $C_2$ to $C_8$ alpha-olefin homo-, co-, or terpolymer, a metallocene catalyzed homo-, co-, or terpolymer comprising propylene, and blends thereof; (d) a sealant skin layer having a side on the first side of the first tie layer, said sealant skin layer comprising a blend of from 25 wt % to 75 wt % of a polyethylene polymer having a density of from 0.910 g/cm³ to 0.950 g/cm³, from 25 wt % to 75 wt % $C_2$ to $C_6$ random copolymer or terpolymer and from 0.3 wt % to 1 wt % antiblock agent; and (e) a second skin layer having a side on the second side of the second tie layer, said second skin layer comprising a polymer selected from the group consisting of polyethylene (PE), polypropylene (PP), ethylene-propylene (EP) copolymer, propylene-butylene (PB) copolymer, ethylene-propylene-butylene (EPB) terpolymer, ethylene-vinyl alcohol (EVOH) polymer, and blends thereof.

2. The film structure of claim 1, wherein said sealant skin layer is from 0.5 μm to 4.0 μm thickness, said first tie layer is from 0.5 μm to 5.0 μm thickness, said core layer is from 10 μm to 50 μm thickness, said second tie layer is from 0.5 μm to 5.0 μm thickness and said second skin layer is from 0.5 μm to 4.0 μm thickness.

3. The film structure of claim 1, wherein said polyethylene polymer has a density of from 0.910 g/cm³ to 0.930 g/cm³, said copolymer or terpolymer is selected from the group consisting of ethylene-propylene (EP), propylene-butylene (PB), ethylene-propylene-butylene (EPB) and combinations thereof, and said antiblock agent is selected from the group consisting of polymethyl methacrylate, cross-linked polymethyl methacrylate, and combinations thereof.

4. The film structure of claim 1, which is biaxially oriented from three to six times the extruded length in the machine direction and from four to ten times the extruded width in the transverse direction.

5. The film structure of claim 1, wherein said first tie layer comprises from 25 wt % to 100 wt % impact copolymer and from 0 wt % to 75 wt % tie layer polymer.

6. The film structure of claim 1, wherein the impact copolymer of the first tie layer has a melting point temperature of less than or equal to 142° C.

7. The film structure of claim 1, wherein the impact copolymer of the first tie layer has a Flexural Modulus of less than or equal to 80 kpsi.

8. The film structure of claim 1, wherein the impact copolymer of the first tie layer has a Vicat Softening Point of less than or equal to 105° C.

9. The film structure of claim 1, wherein the second skin layer is treated with a treatment selected from the group consisting of corona, flame, polarized flame, and plasma.

10. The film structure of claim 1, wherein the second skin layer is coated with at least one coating selected from the group consisting of EVOH, acrylic polymers, polyvinylidene chloride (PVDC), ethylene acrylic acid copolymers (EAA), ethylene methyl acrylate copolymers (EMA), or poly(vinyl) alcohol (PVOH), and combinations thereof.

11. The film structure of claim 1, wherein the second skin layer is metalized.

12. The film structure of claim 11, wherein the second skin layer is metalized by vacuum deposition of a metal selected from the group consisting of aluminum, copper, silver, chromium, and mixtures thereof.

13. The film structure of claim 1, wherein at least one of the core layer, first tie layer, second tie layer and second skin layer comprises at least one additive selected from the group consisting of (a) an opacifying agent selected from the group consisting of iron oxide, carbon black, aluminum, titanium dioxide ($TiO_2$), talc, and combinations thereof (b) a void-initiating particle selected from the group consisting of polybutylene terephthalate, calcium carbonate ($CaCO_3$), and combinations thereof and (c) a hydrocarbon resin, the hydrocarbon resin comprising at least one of a petroleum resin, terpene resin, styrene resin, cyclopentadiene resin, and saturated alicyclic resin.

14. The multilayer film structure of claim 1, wherein the film is formed as a package.

15. The multilayer film structure of claim 14, wherein the package is a pouch.

\* \* \* \* \*